US011752961B2

(12) United States Patent
Gauntt et al.

(10) Patent No.: US 11,752,961 B2
(45) Date of Patent: Sep. 12, 2023

(54) TRAILER WITH REAR IMPACT GUARD (71) Applicant: R.C. Tway Company, LLC, Louisville, KY (US)

(72) Inventors: George W. Gauntt, Georgetown, IN (US); Tyler Payne, Lanesville, IN (US); Derek King, Shepherdsville, KY (US)

(73) Assignee: R.C. Tway Company, LLC, Louisville, KY (US)

( * ) Notice: Subject to any disclaimer, the term of this patent is extended or adjusted under 35 U.S.C. 154(b) by 0 days.

(21) Appl. No.: 17/511,849

(22) Filed: Oct. 27, 2021

(65) Prior Publication Data

US 2022/0134984 A1 May 5, 2022

Related U.S. Application Data (60) Provisional application No. 63/107,129, filed on Oct. 29, 2020.

(51) Int. Cl.
*B60R 19/44* (2006.01)
*B60R 19/56* (2006.01)

(52) U.S. Cl.
CPC ............ *B60R 19/445* (2013.01); *B60R 19/56* (2013.01)

(58) Field of Classification Search
CPC ....... B60R 19/445; B60R 19/44; B60R 19/56; B60R 19/023; B60R 19/24
USPC ........................................ 293/142, 102, 144
See application file for complete search history.

(56) References Cited

U.S. PATENT DOCUMENTS

| | | | |
|---|---|---|---|
| 4,359,239 A | 11/1982 | Eggert, Jr. | |
| 5,632,518 A | 5/1997 | Kendall | |
| 5,673,953 A | 10/1997 | Spease | |
| 6,068,329 A | 5/2000 | Miller | |
| 6,109,675 A | 8/2000 | Sumrail | |
| 6,116,667 A | 9/2000 | Torcomian | |
| 6,176,529 B1 | 1/2001 | Kitzmiller et al. | |
| 6,450,556 B1 | 9/2002 | Jacobs | |
| 6,604,765 B1 | 8/2003 | Eull | |
| 6,652,010 B1 * | 11/2003 | Huddle | B60R 19/56 293/148 |
| 6,764,116 B2 | 7/2004 | Ledford et al. | |
| 7,086,674 B2 | 8/2006 | Goertz | |
| 7,527,309 B2 | 5/2009 | Smidler | |
| 7,762,756 B1 * | 7/2010 | Ablabutyan | B60P 1/445 414/556 |
| 8,100,465 B2 | 1/2012 | Wylezinski | |
| D703,106 S | 4/2014 | Deighton | |
| 9,555,755 B2 | 1/2017 | Franiak et al. | |
| 9,566,923 B2 | 2/2017 | Wylezinski et al. | |
| 9,783,144 B2 | 10/2017 | Miller et al. | |
| 10,035,483 B2 | 7/2018 | Wylezinski et al. | |

(Continued)

*Primary Examiner* — Jason S Morrow
*Assistant Examiner* — Wenwei Zhuo
(74) *Attorney, Agent, or Firm* — Wood Herron & Evans LLP (57) ABSTRACT A trailer has a rear floor assembly having a threshold plate and at least a pair of supports extending downwardly from the threshold plate, a rear lower cross member secured to the rear floor assembly, and a rear impact guard assembly having at least a pair of supports and a horizontal member secured to lower ends of the supports, upper ends of respective ones of the supports of the guard assembly secured to lower ends of respective ones of the supports of the rear floor assembly.

26 Claims, 12 Drawing Sheets

(56) References Cited

U.S. PATENT DOCUMENTS

| | | | |
|---|---|---|---|
| 10,053,037 B2 | 8/2018 | Wylezinski et al. | |
| 10,071,700 B1 | 9/2018 | Ghannam et al. | |
| 10,173,621 B2 | 1/2019 | Oliver et al. | |
| 10,272,859 B2 | 4/2019 | Miller et al. | |
| 10,369,949 B2 | 8/2019 | Miller | |
| D864,038 S | 10/2019 | Miller et al. | |
| 10,525,920 B2 | 1/2020 | Fetz et al. | |
| 10,640,068 B2 | 5/2020 | Miller | |
| 10,710,535 B2 | 7/2020 | Hitchcock | |
| 10,737,646 B2 | 8/2020 | Wylezinski et al. | |
| 2004/0061357 A1* | 4/2004 | Long | B62D 33/04 296/186.3 |
| 2006/0119116 A1* | 6/2006 | Goertz | B60R 19/56 293/132 |
| 2008/0073921 A1 | 3/2008 | Smidler | |
| 2012/0126562 A1* | 5/2012 | Ablabutyan | B60P 1/44 296/26.08 |
| 2013/0249223 A1* | 9/2013 | Deighton | B60R 19/56 293/103 |
| 2016/0207483 A1 | 7/2016 | Franiak et al. | |
| 2017/0050596 A1 | 2/2017 | Miller et al. | |
| 2018/0009401 A1 | 1/2018 | Miller et al. | |
| 2018/0126935 A1 | 5/2018 | Oliver | |
| 2018/0257593 A1 | 9/2018 | Ghannam et al. | |
| 2018/0345891 A1 | 12/2018 | Fetz et al. | |
| 2019/0061660 A1 | 2/2019 | Hitchcock | |
| 2019/0143924 A1* | 5/2019 | Ablabutyan | B60P 1/4485 293/118 |
| 2019/0366964 A1 | 12/2019 | Miller | |

* cited by examiner

TRAILER WITH REAR IMPACT GUARD

RELATED APPLICATIONS

This application claims the priority benefit of U.S. Provisional Patent Application No. 63/107,129 filed Oct. 29, 2020, the entire substance of which is hereby incorporated by reference herein as if fully set forth in its entirety.

FIELD OF THE INVENTION

This invention relates generally to trailers, and more particularly to rear impact guards for trailers.

BACKGROUND OF THE INVENTION

Rear impact guards are generally provided to help reduce injury when light duty vehicles collide with the rear end of a trailer or semi-trailer. Rear impact guards may also help reduce the travel of the light duty vehicle beyond the rear extremity of trailer or semi-trailer in a rear impact collision. Rear impact guards may also absorb a portion of the energy of a rear impact collision of a light duty vehicle into the rear end of a trailer or semi-trailer. Rear impact guards typically include a lower horizontal member that is attached to the rear of the trailer by two or more vertical supports.

Further improvements in rear impact guard design are desired. For example, a rear impact guard design that permits a manufacturer to use the same standardized rear floor assembly in their trailer production process regardless of various other pre-engineered parts being installed later in the process would be desirable. This delayed differentiation in production would give the manufacturer increased flexibility in purchasing and production scheduling processes. For another example, a rear impact guard design that permits the manufacturer to make various changes to the rear frame of the trailer without effecting the function of or causing changes to the rear impact guard would be desirable. This would benefit the manufacturer by reducing engineering time in design and testing of various rear impact guard designs.

SUMMARY OF THE INVENTION

In one aspect, a trailer comprises a pair of opposed side walls, a floor, and a roof. A pair of opposed lower side rails extend generally parallel to a longitudinal axis of the trailer and have aft ends. The floor has an aft end edge forward of the aft ends of the lower side rails. A plurality of transverse frame members span between the lower side rails and underlie and support the floor. A crash plate assembly is secured to the lower side rails and transverse frame members and has a threshold plate, a pair of inboard supports, and a pair of outboard supports, the threshold plate extending from the aft end edge of the floor to the aft ends of the lower side rails. A rear frame assembly is secured to the crash plate assembly, side walls, and roof, the rear frame assembly having a pair of opposed vertical side members, a lower cross member, and an upper cross member. A rear impact guard assembly has a pair of inboard supports, a pair of outboard supports, and a horizontal member secured to lower ends of the inboard and outboard supports of the guard assembly, respective ones of the inboard and outboard supports of the guard assembly secured to respective ones of the inboard and outboard supports of the crash plate assembly.

The trailer can further comprise a pair of longitudinal frame members secured to the transverse frame members, each of the longitudinal frame members having an aft end secured to a respective one of the pair of inboard supports of the crash plate assembly.

The inboard supports of the rear impact guard assembly can be mirror images of each other, and the outboard supports of the rear impact guard assembly can be mirror images of each other. Each support of the rear impact guard assembly can comprise a five-sided plate lying in a generally vertical plane generally parallel to the longitudinal axis of the trailer, the plate having a forward side vertical dimension, an aft side vertical dimension, an upper side horizontal dimension, and a lower side horizontal dimension, the forward side vertical dimension being less than the aft side vertical dimension, the upper side horizontal dimension being greater than the lower side horizontal dimension. Each support of the rear impact guard assembly can further comprise a forward vertical plate, an aft vertical plate, an upper horizontal plate, and a lower horizontal plate. The forward vertical plate is secured to the forward side of the five-sided plate, the aft vertical plate secured to the aft side of the five-sided plate, the upper horizontal plate secured to the upper side of the five-sided plate, and the lower horizontal plate secured to the lower side of the five-sided plate. All the plates are preferably generally perpendicular to the five-sided plate.

In another aspect, a trailer comprises a pair of opposed lower side rails extending generally parallel to a longitudinal axis of the trailer, a pair of opposed side walls, a main floor, and a roof, the main floor secured to the pair of lower side rails, a rear floor assembly secured to the pair of lower side rails, the rear floor assembly having a threshold plate and at least a pair of supports, a rear frame assembly secured to the rear floor assembly, side walls, and roof, the rear frame assembly having a pair of opposed vertical side members, a lower cross member, and an upper cross member, and a rear impact guard assembly having at least a pair of supports and a horizontal member secured to the supports, respective ones of the supports of the guard assembly secured to respective ones of the supports of the rear floor assembly.

The main floor and rear floor assembly can be configured such that either the aft end edge of the main floor is adjacent a forward end edge of said threshold plate, or the main floor underlies the threshold plate and the aft end edge of the main floor is adjacent an aft end edge of the threshold plate.

The rear floor assembly can have a pair of inboard supports and a pair of outboard supports. The rear impact guard assembly can have a pair of inboard supports and a pair of outboard supports. Respective ones of the supports of the guard assembly can be secured to respective ones of the supports of the rear floor assembly.

The inboard supports of the rear impact guard assembly can be mirror images of each other, and the outboard supports of the rear impact guard assembly can be mirror images of each other.

The rear floor assembly can further comprise a plurality of transverse frame members and a plurality of longitudinal frame members interconnecting the transverse frame members. The threshold plate can overlie the transverse frame members and the longitudinal frame members and be secured to the transverse frame members and/or the longitudinal frame members. The rear floor assembly supports can underlie the transverse frame members and the longitudinal frame members and be secured to the transverse frame members and/or the longitudinal frame members.

The trailer can further comprise a plurality of transverse frame members spanning between the lower side rails and underlying and supporting the main floor. A pair of longitudinal frame members can be secured to the transverse frame members, with each of the longitudinal frame members having an aft end secured to a respective one of the pair of inboard supports of the rear floor assembly.

Each of the supports of the guard assembly can have a horizontal and a vertical interface surface and each of the supports of the rear floor assembly can have a horizontal and a vertical interface surface. The horizontal surfaces of the supports of the guard assembly can mate with and be secured to the horizontal surfaces of the supports of the rear floor assembly, and the vertical surfaces of the supports of the guard assembly can mate with and be secured to the vertical surfaces of the supports of the rear floor assembly. For example, the horizontal interface surfaces can be connected with bolts and the vertical interface surfaces can be connected with bolts and shear pins.

In another aspect, a trailer comprises a pair of opposed lower side rails extending generally parallel to a longitudinal axis of said trailer, a forward floor secured to the pair of lower side rails, a rear floor assembly secured to the pair of lower side rails, the rear floor assembly having a threshold plate and at least a pair of downwardly extending supports, a rear frame assembly having a lower cross member, the lower cross member secured to the rear floor assembly, and a rear impact guard assembly having at least a pair of upwardly extending supports and a horizontal member secured to lower ends of the supports, respective ones of the supports of the guard assembly secured to respective ones of the supports of the rear floor assembly.

The rear floor assembly can further include a generally rectangular framework, the threshold plate overlying and secured to the framework, the supports secured to the framework and extending downwardly therefrom.

The trailer can further comprise a plurality of transverse frame members spanning between the lower side rails and underlying and supporting the forward floor, and a pair of longitudinal frame members secured to the transverse frame members, each of the longitudinal frame members having an aft end secured to a respective one of the pair of supports of the rear floor assembly.

As in prior embodiments, the trailer of this embodiment can have a forward floor/rear floor assembly configuration wherein either an aft end edge of the forward floor is adjacent a forward end edge of the threshold plate, or the forward floor underlies the threshold plate and the aft end edge of the forward floor is adjacent an aft end edge of the threshold plate.

The lower side rails, rear floor assembly, rear frame assembly, and rear impact guard assembly can be secured together with bolts. The rear floor assembly and rear impact guard assembly can additionally be secured together with shear pins. The horizontal member can be secured to the upwardly extending supports with bolts.

In another aspect, a trailer comprises a rear floor assembly having a threshold plate and at least a pair of supports extending downwardly from the threshold plate, a rear lower cross member secured to the rear floor assembly, and a rear impact guard assembly having at least a pair of supports and a horizontal member secured to lower ends of the supports, upper ends of respective ones of the supports of the guard assembly secured to upper ends of respective ones of the supports of the rear floor assembly.

The rear floor assembly can further include a sub frame, with the threshold plate overlying and secured to the sub frame, the pair of supports of the rear floor assembly secured to the sub frame and extending downwardly therefrom, and the rear lower cross member secured to the sub frame. The trailer can further include a pair of opposed lower side rails extending generally parallel to a longitudinal axis of the trailer, and a plurality of transverse frame members spanning between the lower side rails. The sub frame can be secured to the lower side rails and the transverse frame members. The trailer can further include a main floor overlying and supported by the transverse frame members, and the main floor can have an aft end edge adjacent a forward end edge of the threshold plate. The supports of the rear impact guard assembly can be secured to the supports of the rear floor assembly at least in part with shear pins.

The accompanying drawings, which are incorporated in and constitute a part of this specification, illustrate embodiments of the invention and, together with the summary of the invention given above, and the detailed description of the drawings given below, serve to explain the principles of the present invention.

DETAILED DESCRIPTION OF THE DRAWINGS

Figure 1:
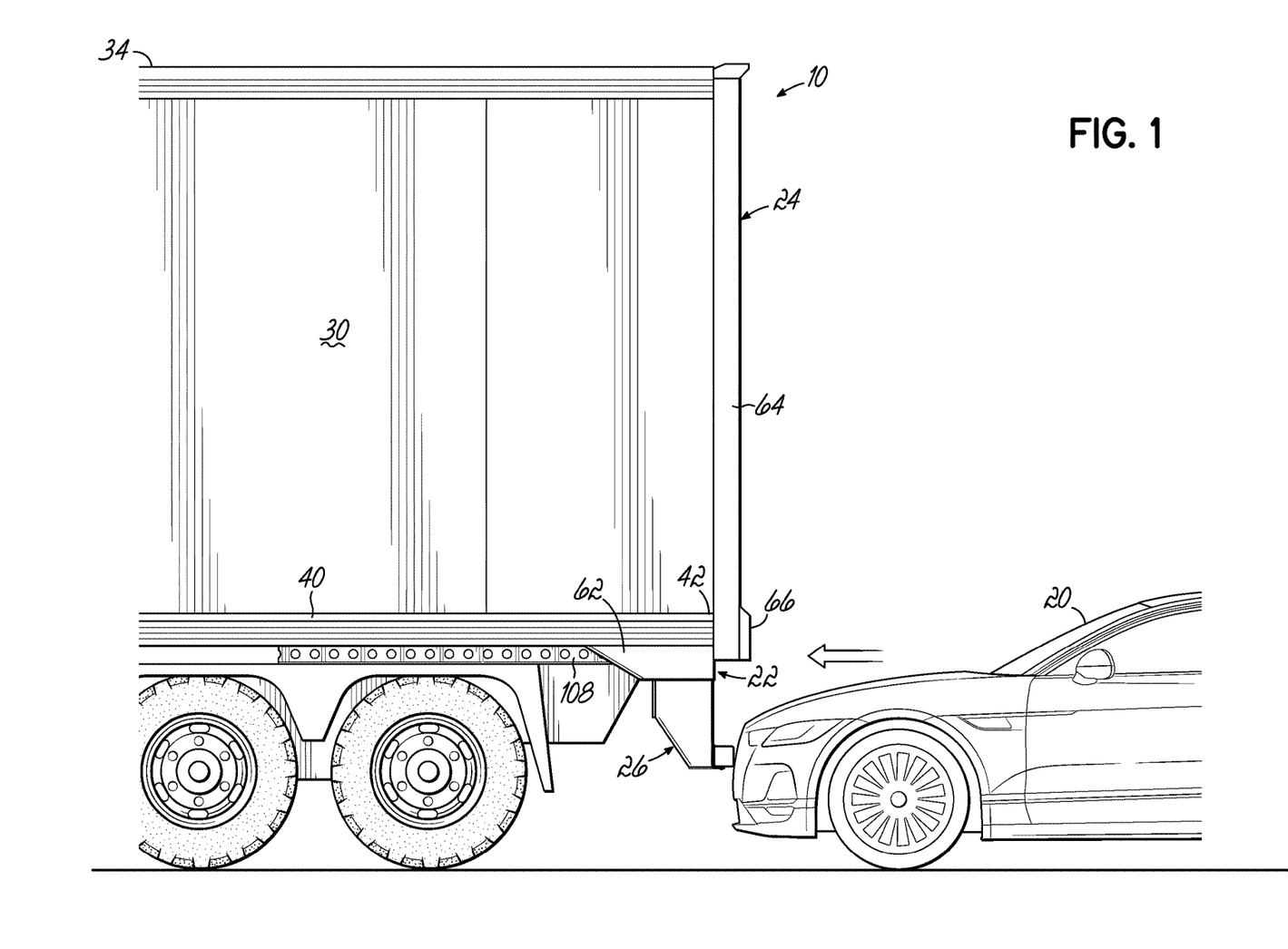
FIG. 1 is a side view of a trailer and a light duty vehicle just prior to the vehicle colliding into the rear of the trailer.
Figure 2:
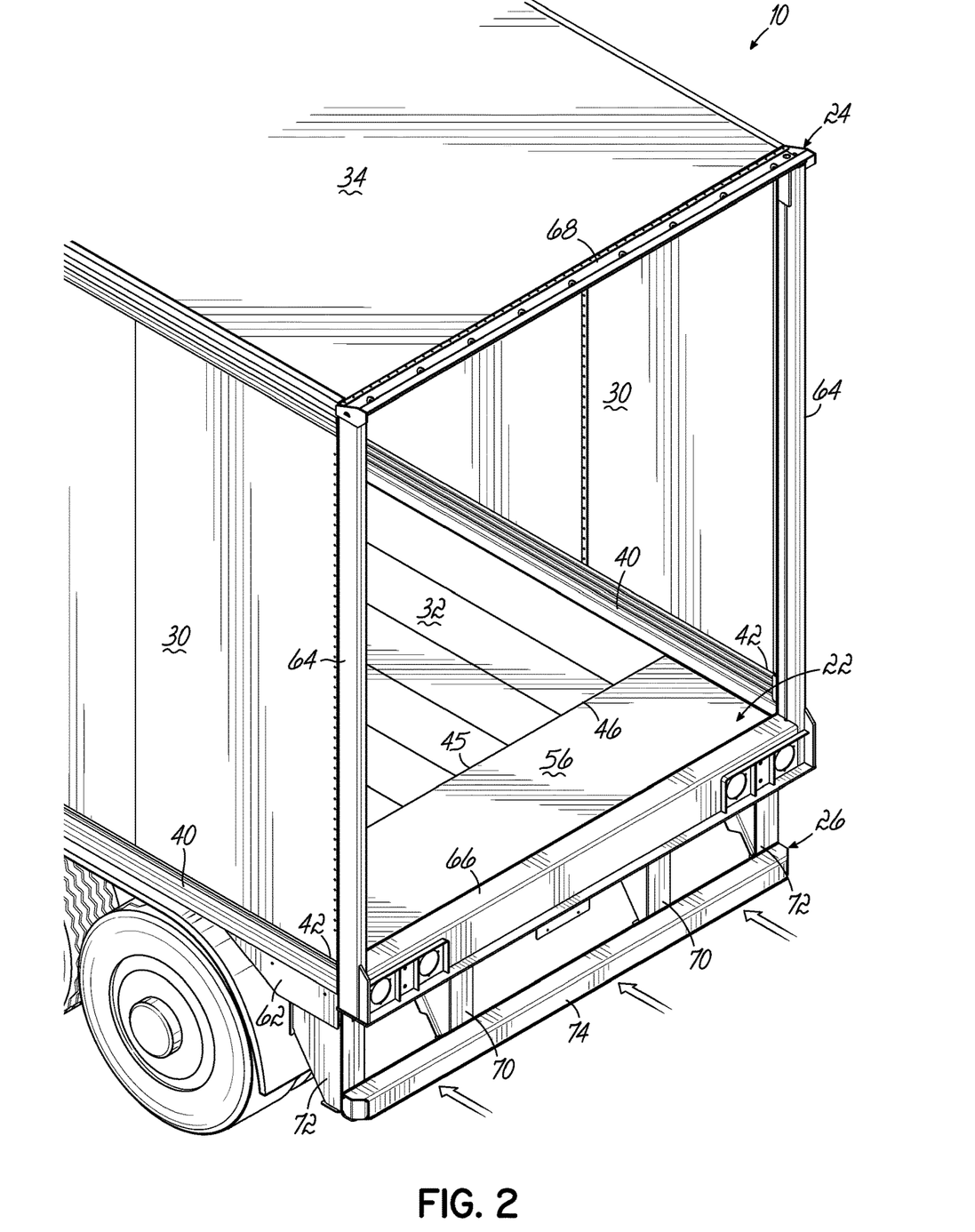
FIG. 2 is a rear top perspective view of the trailer of FIG. 1 illustrating the rear impact guard.
Figure 3:
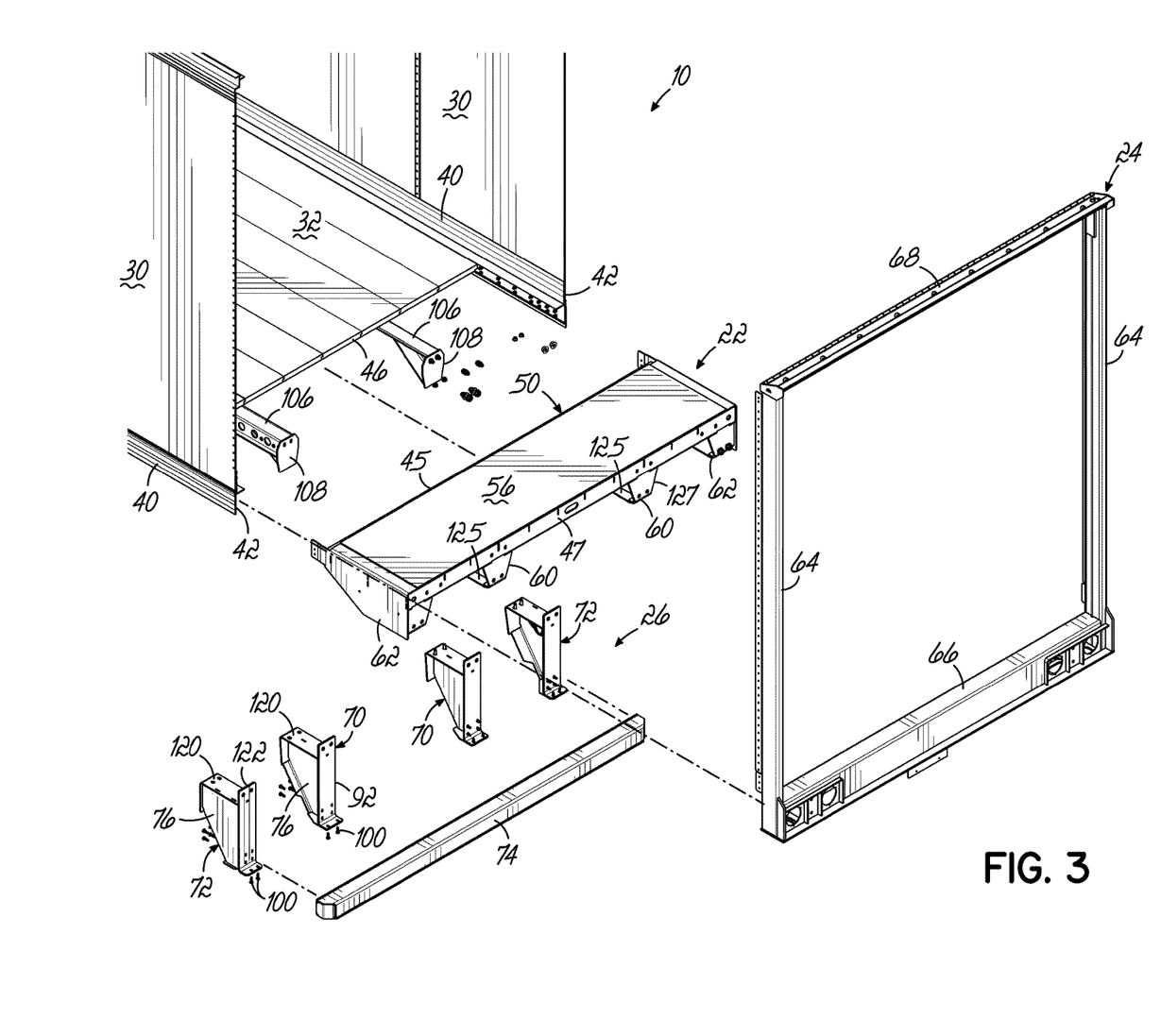
FIG. 3 is an exploded perspective view of FIG. 2.
Figure 4:
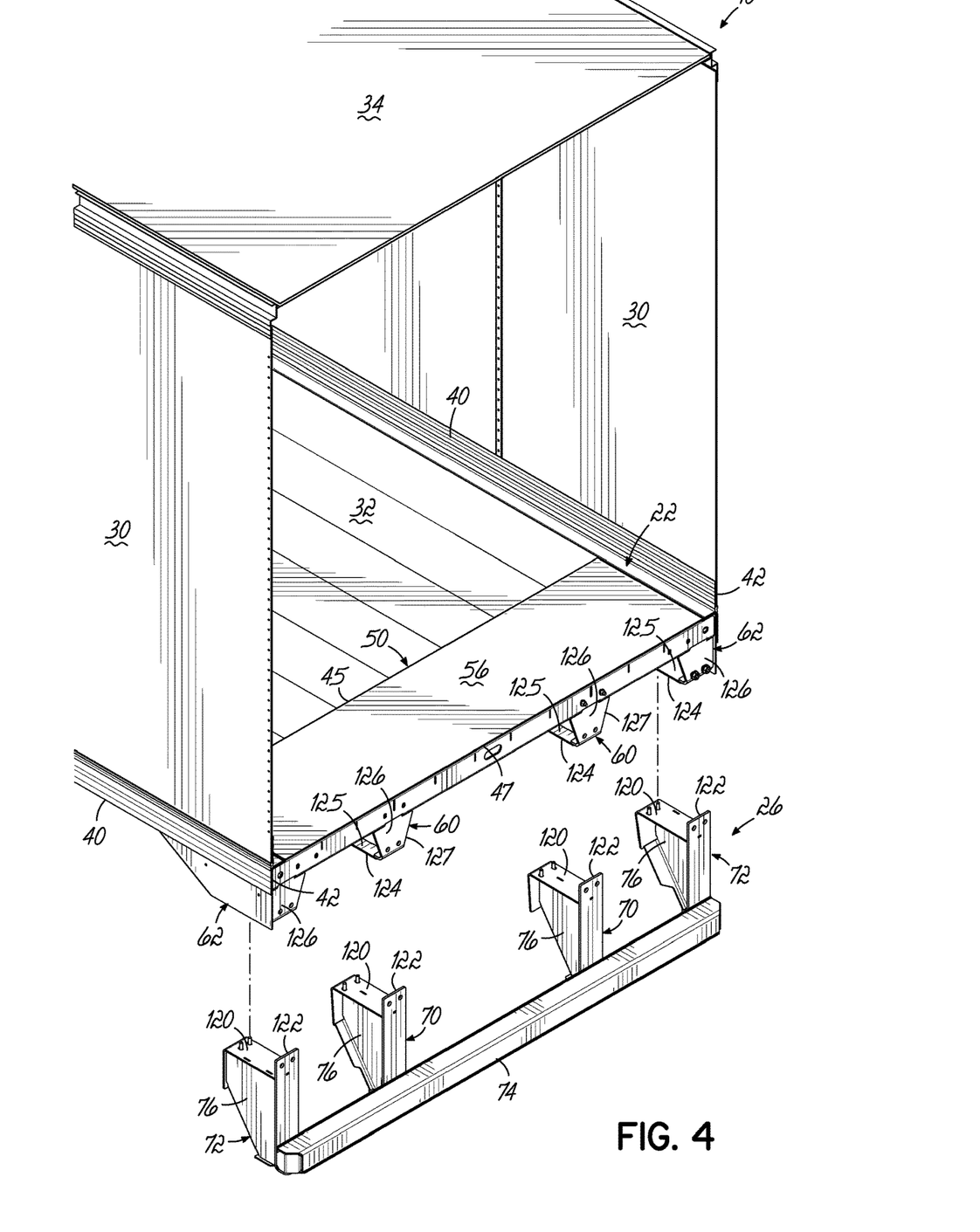
FIG. 4 is a partially disassembled perspective view similar to FIGS. 1 and 3.
Figure 5:
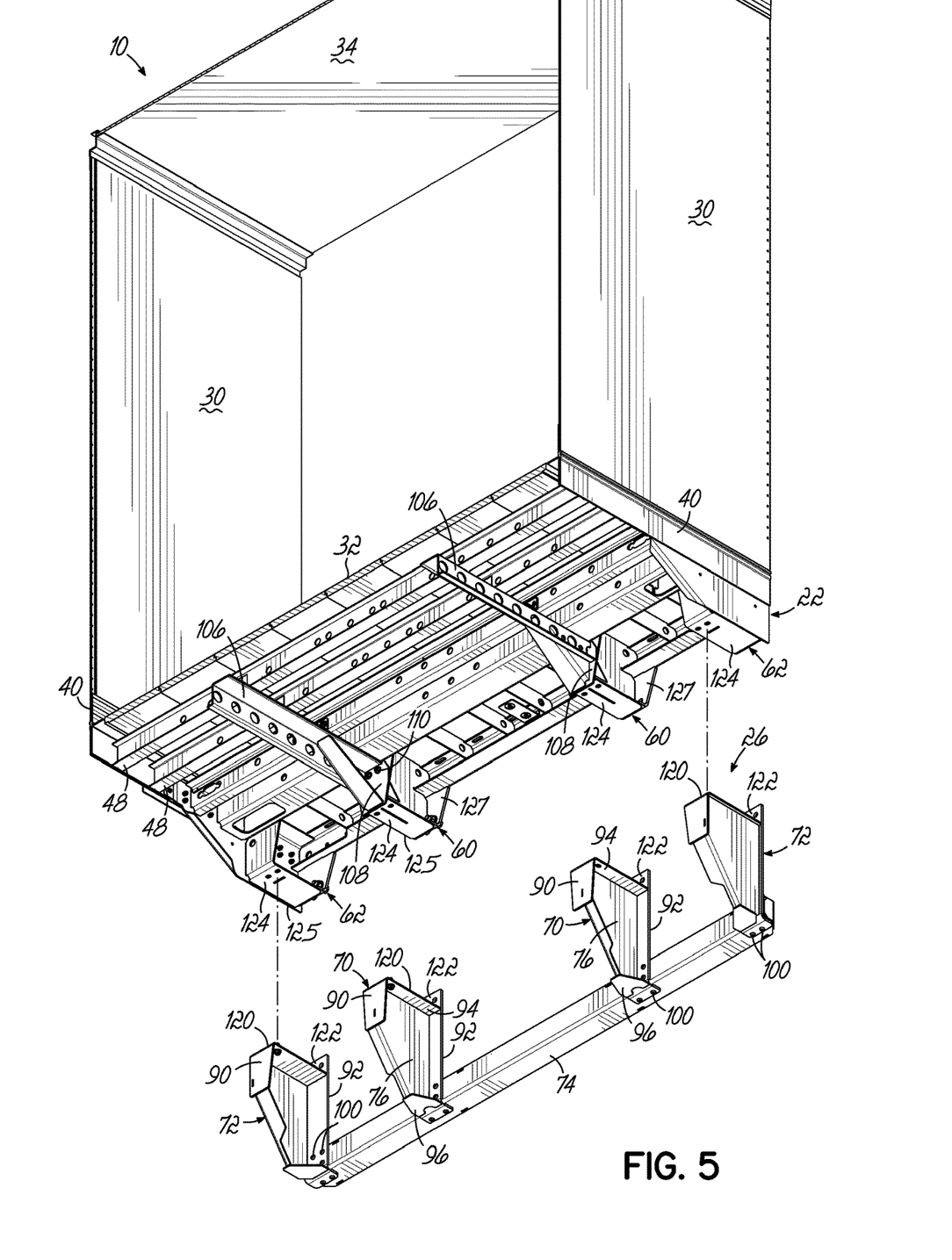
FIG. 5 is front bottom partially disassembled perspective similar to FIG. 4.
Figure 6:
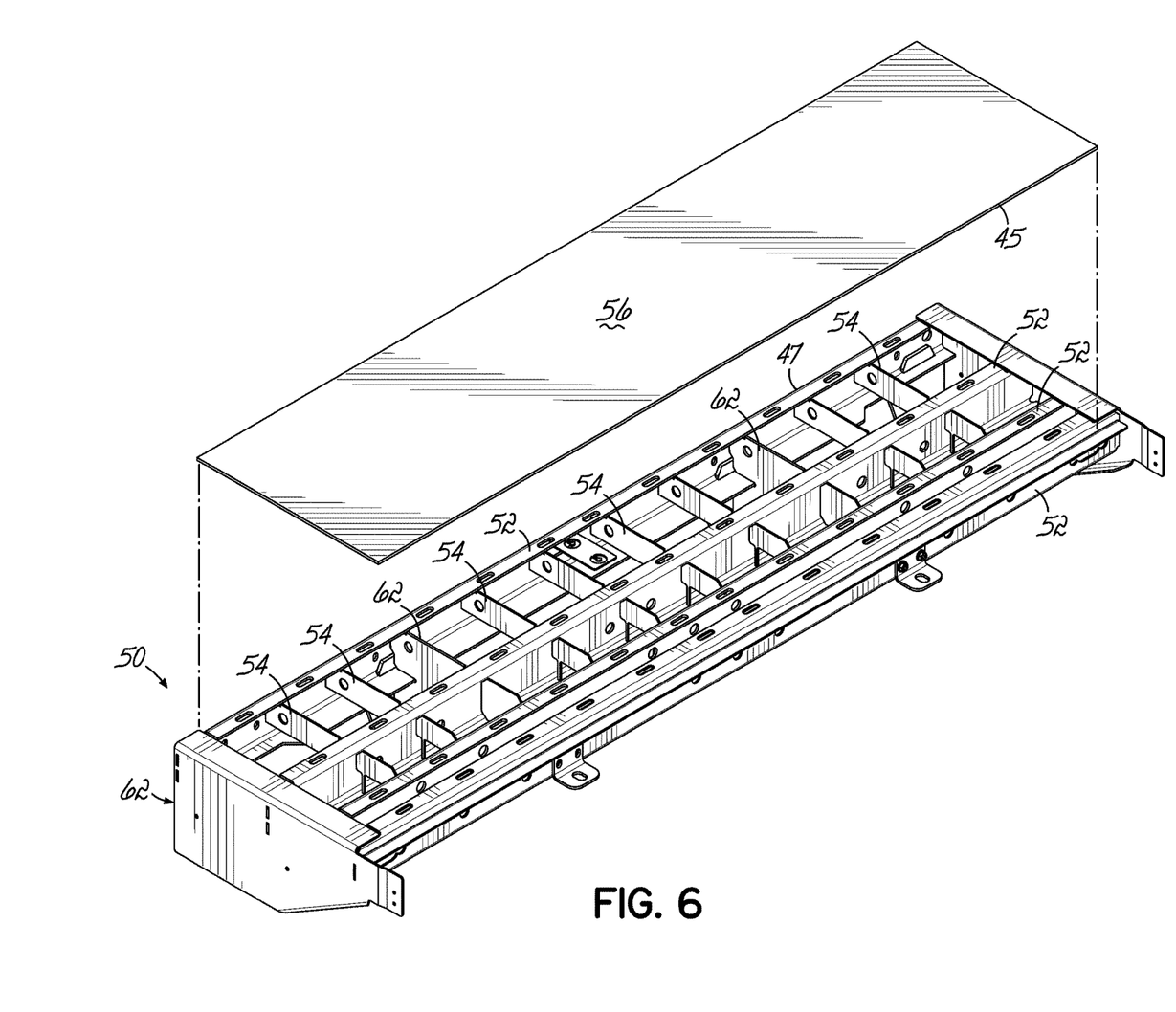
FIG. 6 is a rear top partially disassembled perspective view of the crash plate assembly.

Referring first to FIGS. 1 and 2, there is illustrated a trailer 10 incorporating rear impact protection according to the principles of the present invention. The rear impact protection embodied in trailer 10 includes three main assemblies, which work together as a system: a rear floor or crash plate assembly 22, a rear frame assembly 24, and a rear impact guard assembly 26.

Referring now to FIGS. 3-7, the trailer 10 includes a pair of opposed side walls 30, a forward or main floor 32, and a roof 34. A pair of opposed lower side rails 40 extend generally parallel to a longitudinal axis of the trailer 10 and have aft ends 42. As illustrated, the main floor 32 has an aft end edge 46 located forward of the aft ends 42 of the lower side rails 40. A plurality of transverse frame members 48, for example !-beams, span between the lower side rails 40 and underlie and support the main floor 32.

The rear floor assembly or crash plate assembly 22 includes a generally rectangular framework or sub frame or box structure 50 having a plurality of transverse frame members 52, for example I-beams, box sections, C-sections, or rectangular cross-section bars, and a plurality of longitudinal frame members 54, for example I-beams, box sections, C-sections, or rectangular cross-section bars, interconnecting the transverse frame members 52. A threshold plate 56 overlies the transverse frame members 52 and longitudinal frame members 54 and is secured to the transverse frame members 52 and/or longitudinal frame members 54. The assembly further includes a pair of inboard supports 60 and a pair of outboard supports 62 underlying the transverse frame members 52 and longitudinal frame members 54 and secured to the transverse frame members 52 and/or the longitudinal frame members 54. While four such supports have been illustrated, it will be readily apparent that more than four such supports or fewer than four such supports can be utilized and still be within the scope of the invention.

Note that in addition to the illustrated configuration of main floor 32 and rear floor assembly 22 wherein the aft end edge 46 of the main floor 32 is adjacent the forward end edge 45 of the threshold plate 56, the main floor 32 could underlie the threshold plate 56 such that the aft end edge 46 of the main floor 32 extends rearwardly so as to be adjacent an aft end edge 47 of the threshold plate 56.

The rear frame assembly 24 is secured to the rear floor or crash plate assembly 22, side walls 30, and roof 32. The rear frame assembly 24 includes a pair of opposed vertical side frame members 64, a lower cross frame member 66, and an upper cross frame member 68. The lower cross frame member 66 is secured to the generally rectangular framework or sub frame or box structure 50.

The rear impact guard assembly 26 has a pair of inboard supports 70, a pair of outboard supports 72, and a horizontal member or guard rail 74 secured to lower ends of the supports 70 and 72. As with the rear floor or crash plate assembly 22, while the rear impact guard assembly 26 is illustrated as having four such supports, it will be readily apparent that more than four such supports or fewer than four such supports can be utilized and still be within the scope of the invention.

Figure 7:
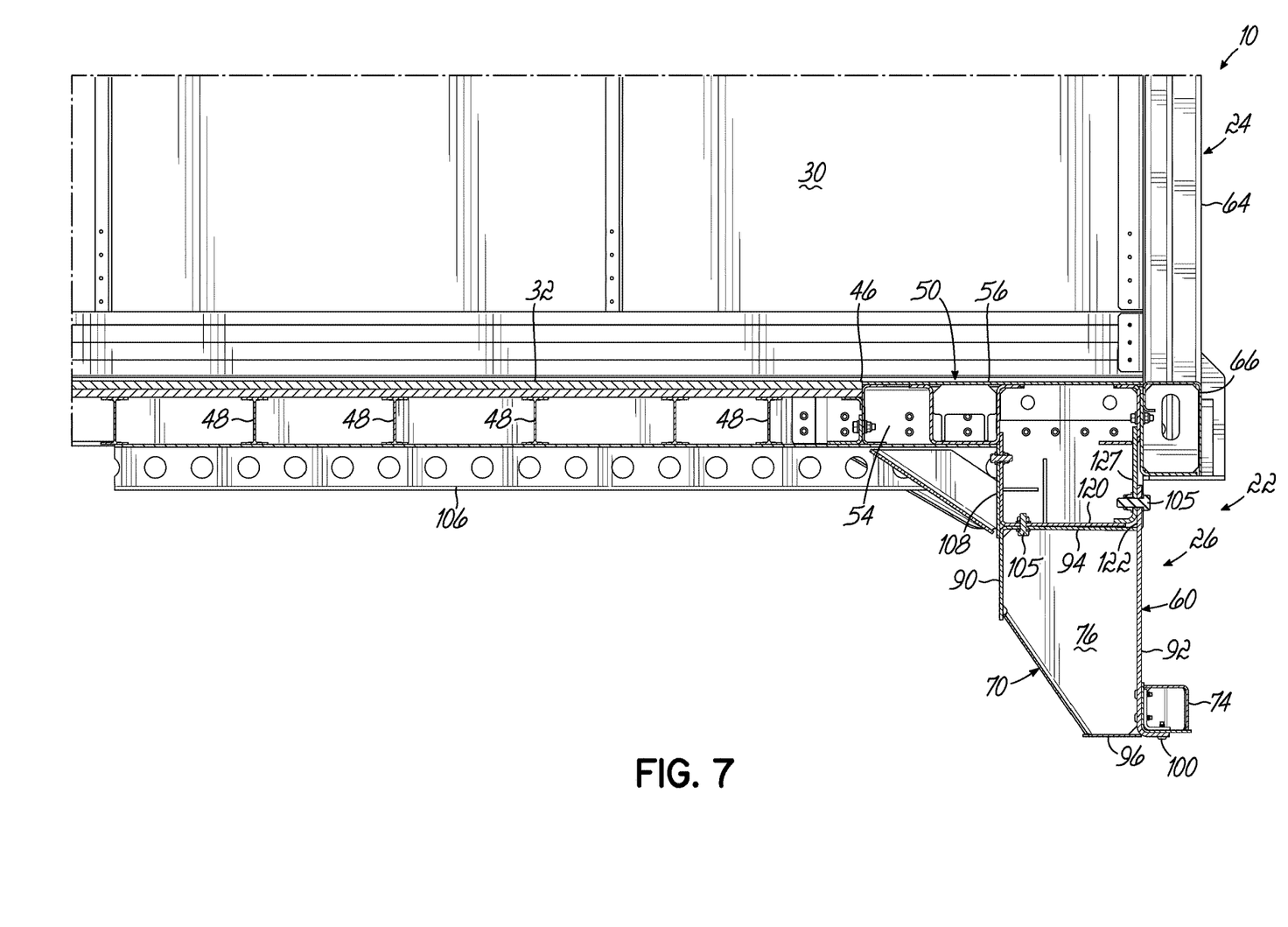
FIG. 7 is a side cross-sectional view taken along a vertical plane parallel to the longitudinal axis of the trailer.
Figure 7A:
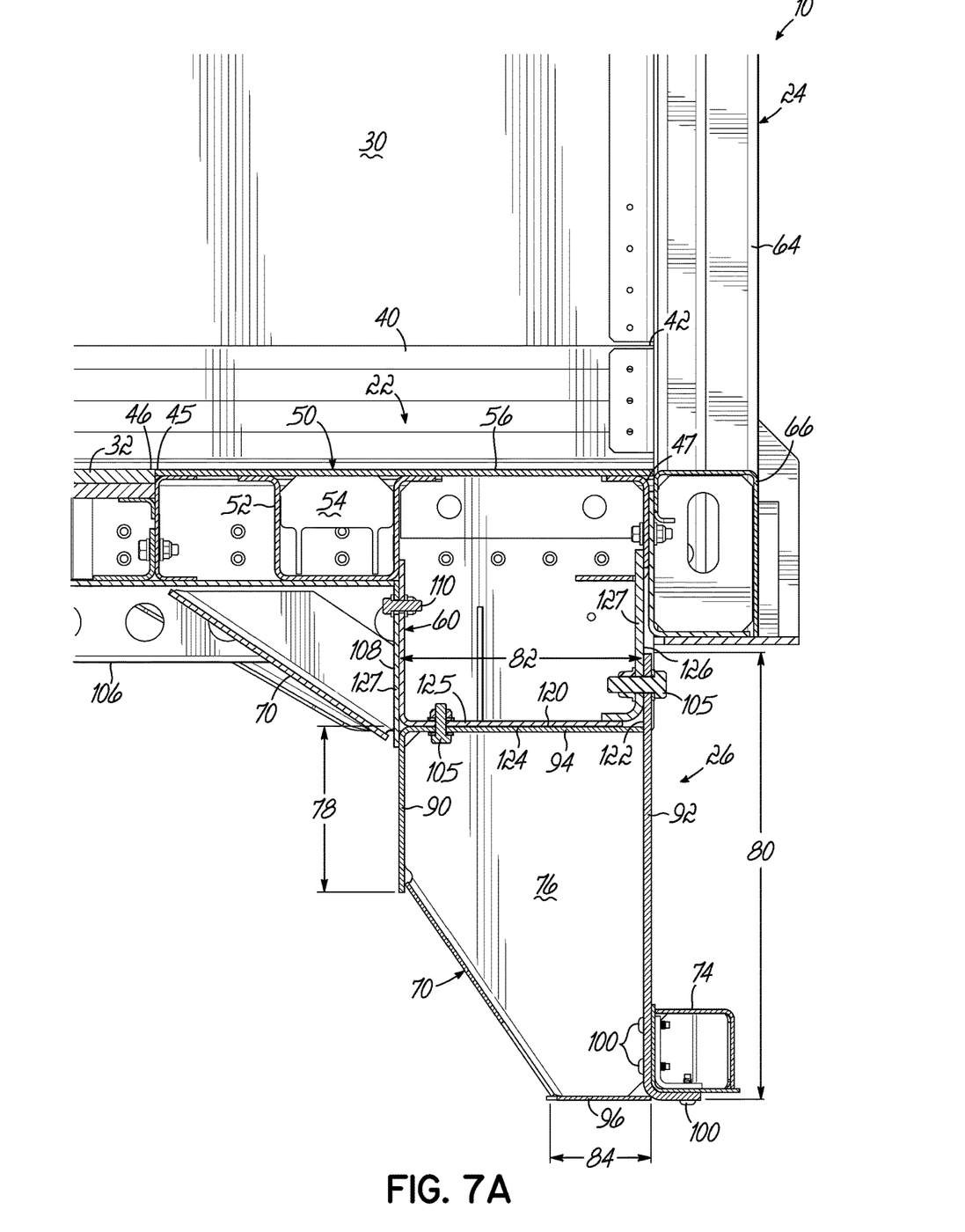
FIG. 7A is an enlarged view of the aft end of the trailer shown in FIG. 7.
Figure 8:
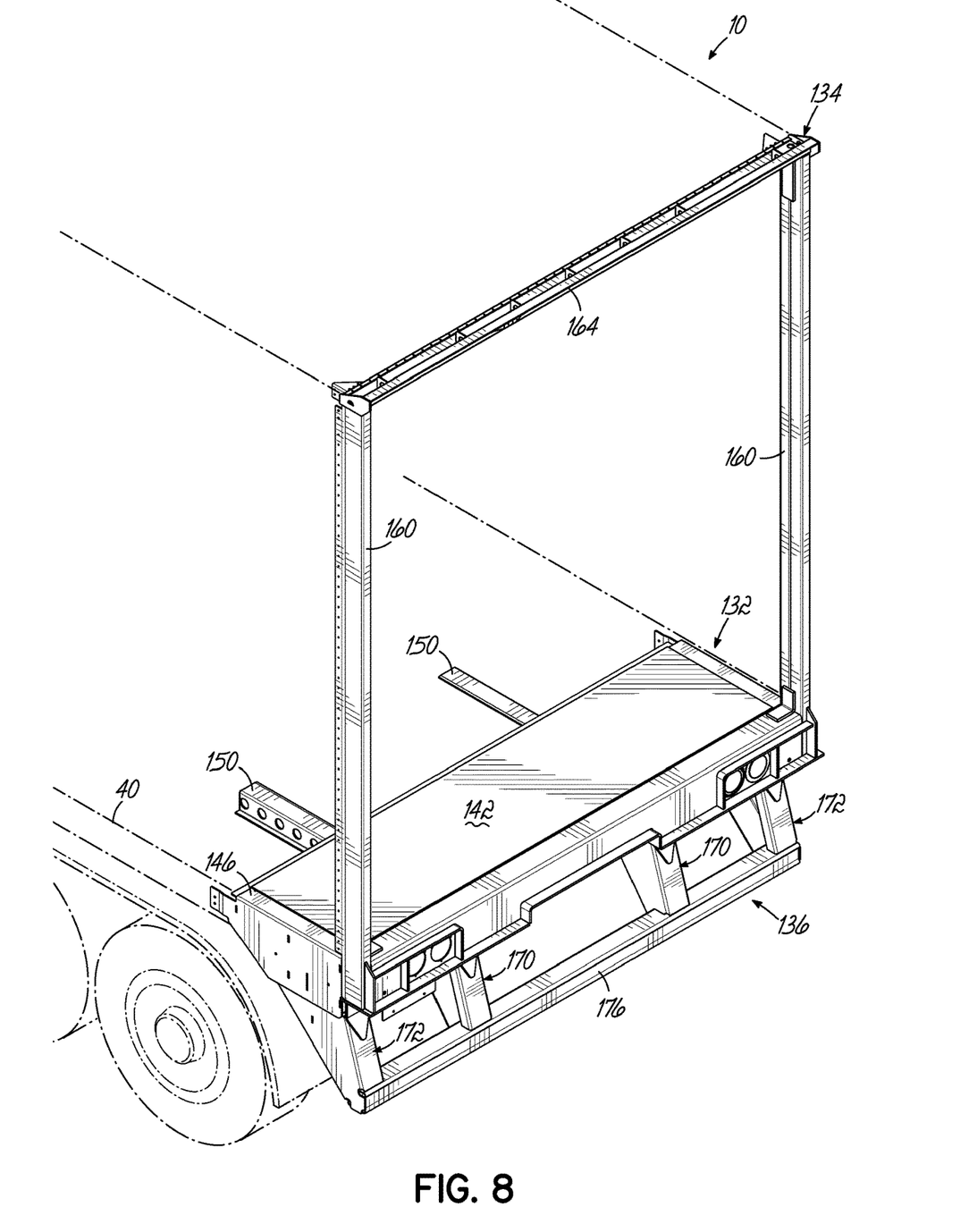
FIG. 8 is a rear top perspective view of a trailer incorporating an alternative embodiment of the rear impact guard.
Figure 9:
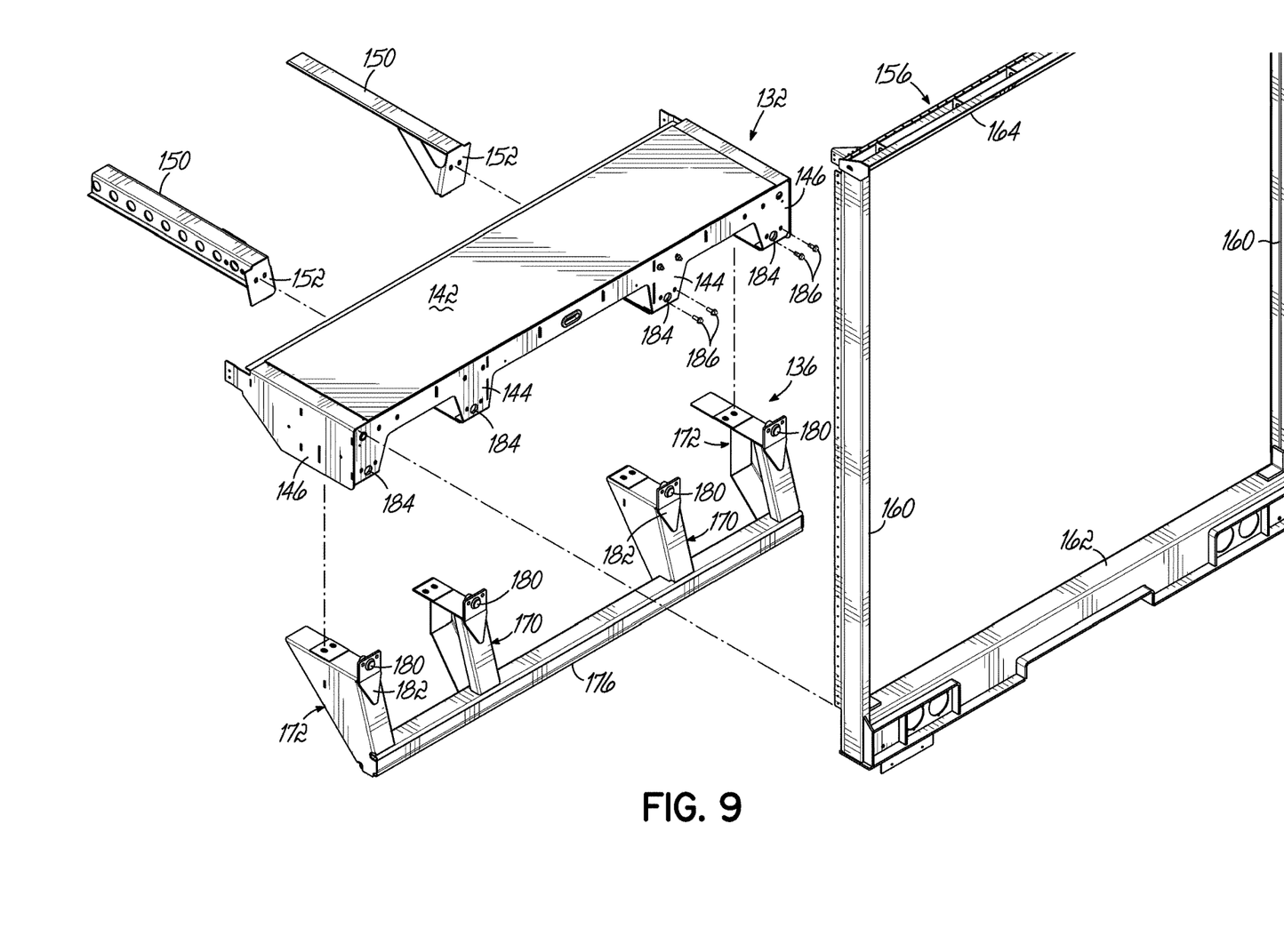
FIG. 9 is an exploded perspective view of FIG. 8.
Figure 10:
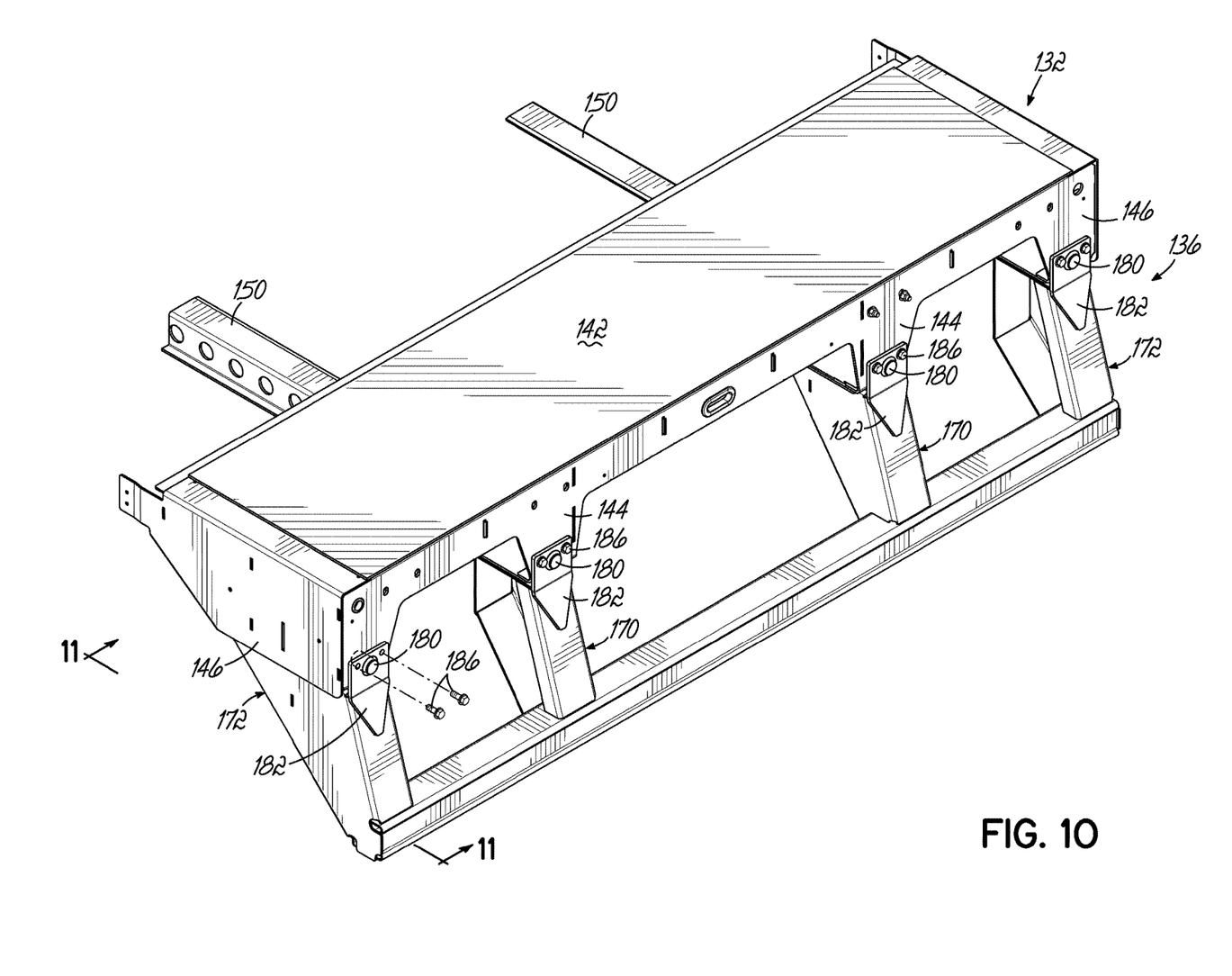
FIG. 10 is a rear top perspective view of the rear floor/crash plate assembly of FIGS. 8 and 9.
Figure 11:
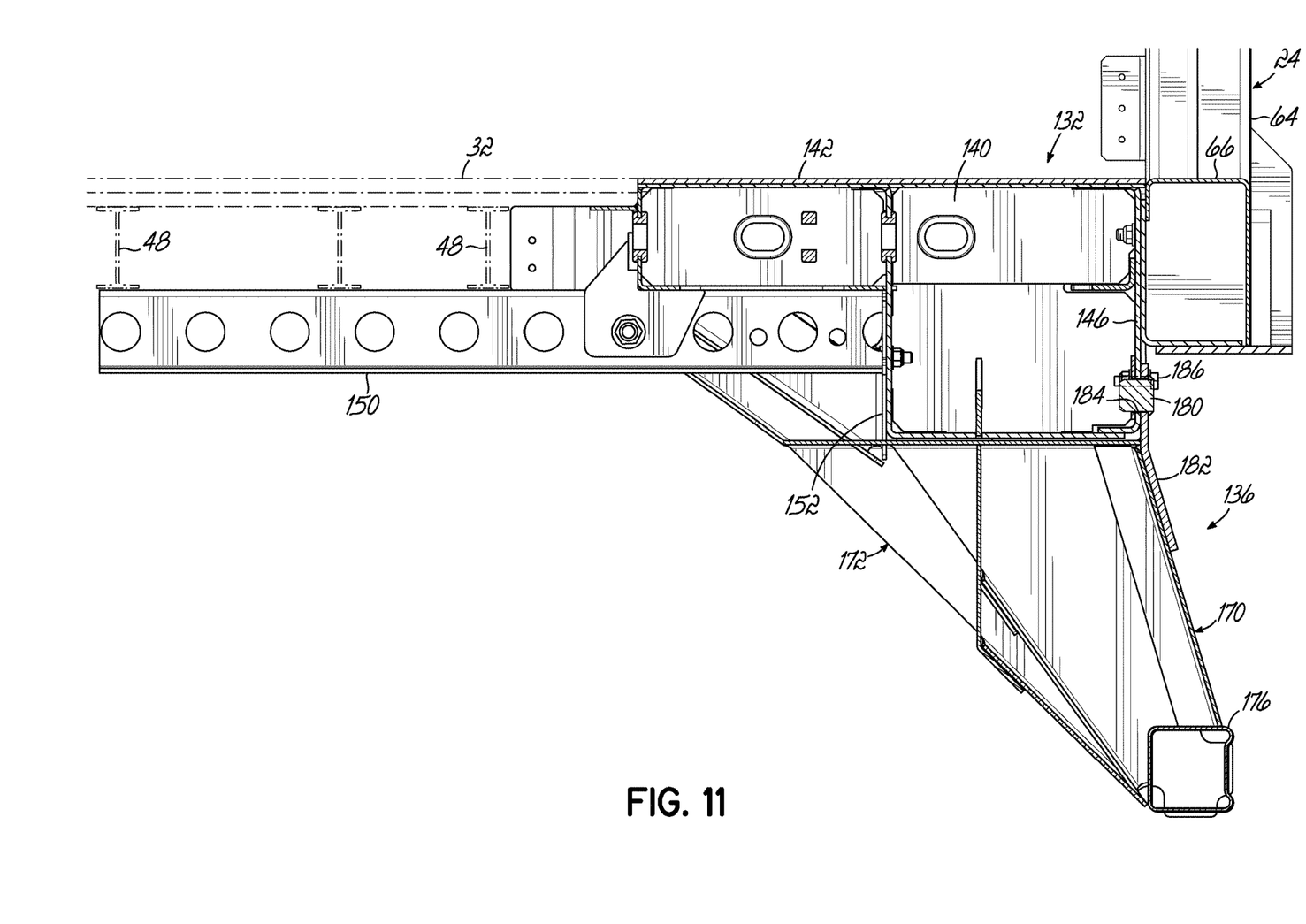
FIG. 11 is a side cross-sectional view taken along line 11-11 in FIG. 10.

The inboard supports 70 are preferably, but not necessarily, mirror images of one another, and the outboard supports 72 are preferably, but not necessarily, mirror images of one another. Each of the supports 70, 72 are preferably, but not necessarily, in the form of a five-sided plate 76 lying in a generally vertical plane generally parallel to the longitudinal axis of said trailer 10. As best shown in FIG. 7A, each plate 76 has a forward side vertical dimension 78, an aft side vertical dimension 80, an upper side horizontal dimension 82, and a lower side horizontal dimension 84. The forward side vertical dimension 78 is preferably less than the aft side vertical dimension 80, and the upper side horizontal dimension 82 is preferably greater than the lower side horizontal dimension 84. Each support 70, 72 of the rear impact guard assembly 26 further includes a forward vertical plate 90, an aft vertical plate 92, an upper horizontal plate 94, and a lower horizontal plate 96. All plates 90, 92, 94, 96 are secured to the five-sided plate 76 so as to be generally perpendicular thereto. As examples, the plates 76, 90, 92, 94, 96 could be a weldment, a bolted assemblage, a forging, a casting, or bent/stamped from a single sheet. The horizontal member 74, generally in the form of a square or rectangular cross-section tube, can be secured to the aft vertical plates 92 and lower horizontal plates 96 of the supports 70, 72 with, for example, bolts 100.

The trailer 10 can further include a pair of longitudinal frame members or slider rails 106, for example angle sections, secured to the transverse frame members 48. Each of the longitudinal frame members 106 underlies and supports rectangular framework/sub frame/box structure 50, and has an aft end 108 secured to a respective one of the pair of inboard supports 60 of the rear floor or crash plate assembly 22 as by bolts 110.

Each of the supports 70, 72 of the guard assembly 26 has a horizontal 120 and a vertical 122 interface surface associated with plates 82 and 80, respectively. In compliment therewith, each of the supports 60, 62 of the rear floor assembly 22 has a horizontal 124 and a vertical interface 126 surface associated with plates 125 and 127, respectively. The horizontal surfaces 120 of the supports 70, 72 of the guard assembly 26 mate with the horizontal surfaces 124 of the supports 60, 62 of the rear floor assembly 22, and the vertical surfaces 122 of the supports 70, 72 of the guard assembly 26 mate with the vertical surfaces 126 of the supports 60, 62 of the rear floor assembly 22. The plate structures forming these respective mating interface surfaces can be secured together as with bolts 105 or the like.

The rear floor/crash plate assembly 22 provides a number of advantages. Currently most manufacturers mount their rear impact guards directly to the lower cross member of the rear frame assembly. In contrast, the present invention mounts the rear floor/crash plate assembly 22 to the trailer 10, mounts the rear impact guard assembly 26 to the rear floor/crash plate assembly 22, and mounts the rear frame assembly 24 to the rear floor/crash plate assembly 22. The use of the rear floor/crash plate assembly 22 allows the rear impact guard assembly 26 to be mounted earlier in the trailer assembly process. It also allows the use of different rear frame assembly 24 designs without making any changes to the rear impact guard assembly 26. For example, the rear frame assembly 24 can be fabricated out of stainless steel or galvanized steel and the rear impact guard assembly 26 is not affected. A pintle hook mount can be added to the rear floor/crash plate assembly 22, and the lower frame member 66 of the rear frame assembly 24 can be coped out to accommodate it, without affecting the rear impact guard assembly 26.

The rear floor/crash plate assembly 22 has common mounting points for the rear impact guard assembly 26, allowing the rear impact guard assembly 26 to be modified in the future and still be reverse compatible with older rear floor/crash plate assemblies 22. This allows improvements to be made in the rear impact guard assembly 26 going forward while permitting new rear impact guard assembly 26 designs to remain compatible with older trailers.

The rear floor/crash plate assembly 22 incorporates a threshold plate 56, which is the steel plate that typically covers the rear few feet of the trailer floor 32. The purpose of the threshold plate 56 is to protect the wood surface of the trailer floor 32 from the dock leveling system at the trailer loading docks. This system has a steel transition plate that is flipped down on the rear of the trailer and acts as a ramp between the loading dock and the trailer floor 32. The installation of the threshold plate 56 is typically a separate operation, which is eliminated by the rear floor/crash plate assembly 22. This reduces labor on the production line by eliminating the need for this added feature during the production process. This design also helps protect the rear portion of the wooden trailer floor 32 if the rear doors of the trailer are left open during rainy weather. Typical threshold plates trap moisture between the plate and the top surface of the wood floor, which is detrimental to the life of the wood floor. This problem is completely eliminated by the embodiment of the main floor/rear floor assembly wherein the aft end edge of the main floor is adjacent a forward end edge of the threshold plate.

The rear frame assembly 24 also provides a number of advantages. It has a bolted connection with common mounting points to the rear floor/crash plate assembly 22. These common mounting points are specially designed to work around known features that are commonly added to trailer rear frames. One of these features is a walk board, which typically requires the lower cross frame member of the rear frame assembly to be coped out at the bottom to allow the walk board to slide into the rear of the trailer when it is not in use. Coping out the lower cross frame member of the rear frame assembly would typically require a test to validate that it did not reduce the effectiveness of the rear impact guard assembly, since the typical rear impact guard assembly is mounted to the bottom surface of this lower cross frame member of the rear frame assembly. Another feature commonly added to the rear of trailers is a pintle hook assembly, which typically mounts between the two inner uprights or supports of the rear impact guard assembly. The lower cross frame member of the rear frame assembly would also typically be coped out on the bottom to give room for the trailer dolly to engage the pintle hook without contacting the trailer structure. The common mounting points allow for this coping out of the lower cross frame member 66 of the rear frame assembly 24 without affecting the performance of the rear impact guard assembly 26.

The rear impact guard assembly 26 also provides a number of advantages. In a preferred embodiment, the rear impact guard assembly 26 is made up of four uprights or supports 70, 72, which are connected to the bottom of the rear floor/crash plate assembly 22 (more or less than four can of course be used). The bottom ends of the uprights or supports 70, 72 of the rear impact guard assembly 26 are all connected together with a horizontal member 74. The four uprights or supports 70, 72 and the horizontal member 74 are all bolted together, which allows them to be repaired individually if required.

The outer two uprights or supports 72 are similar mirror image assemblies, and the inner two uprights or supports 70 are similar mirror image assemblies. Typical rear impact guard assemblies in the marketplace have only two inner uprights. Including the two additional outer uprights or supports 72 (the four uprights/supports embodiment) helps reduce the chance of underride of an impacting vehicle when only 30% of the impacting vehicle contacts the rear impact guard assembly 26.

The rear floor/crash plate assembly, rear lower cross frame member, and rear impact guard assembly can be readily incorporated into flat bed trailers.

Referring now to FIGS. 8-11, an alternative embodiment of the rear floor or crash plate assembly 132, rear frame assembly 134, and rear impact guard assembly 136 is illustrated.

As in the prior embodiment, rear floor/crash plate assembly 132 includes a sub frame 140, a threshold plate 142 overlying and secured to the sub frame 140, and a pair of inner supports 144 and a pair of outer supports 146 extending downwardly from the sub frame 140. A pair of longitudinal frame members 150 tie in to the transverse frame members 48 underlying the main or forward floor 32 as with bolts, underlie, support, and tie in to the sub frame 140 as with bolts, and have aft ends 152 that are secured to respective ones of the pair of inner supports 144 as with bolts.

Rear frame assembly 156 likewise has a pair of opposed vertical side frame members 160, a lower cross frame member 162, and an upper cross frame member 164. As in the prior embodiment, lower cross frame member 162 of rear frame assembly 156 is secured to sub frame 140 of rear floor/crash plate assembly 132 as with bolts.

As in the prior embodiment, rear impact guard assembly includes a pair of inner supports 170 and a pair of outer supports 172. The supports 170, 172 are generally of the five-sided variety as in the prior embodiment, however they are slightly more raked towards the rear. The lower horizontal member 176 is welded to the lower ends of the supports 170, 172 rather than being bolted thereto as in the prior embodiment. Each connection of respective ones of the supports 170, 172 to respective ones of the supports 144, 146, additionally includes a shear pin 180. Each support additionally includes a reinforcement plate 182 secured as by welding to the upper end of each of the supports 170, 172. The shear pins 180 are pressed into and/or welded into holes in plates 182 and are installed in aligned holes 184 in supports 144, 146, and provide additional load carrying and transferring capability. Bolts 186 additionally secure plates 182 to supports 144, 146.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. The invention resides in each individual feature described herein, alone, and in all combinations of any and all of those features. Accordingly, the scope of the invention shall be limited only by the following claims and their equivalents.

What is claimed is:
1. A trailer comprising:
a pair of opposed side walls, a floor, and a roof,
a pair of opposed lower side rails extending generally parallel to a longitudinal axis of said trailer and having aft ends,
said floor having an aft end edge forward of said aft ends of said lower side rails,
a plurality of transverse frame members spanning between said lower side rails and underlying and supporting said floor,
a crash plate assembly secured to said lower side rails and transverse frame members and having a threshold plate, a pair of inboard supports, and a pair of outboard supports, said threshold plate extending from said aft end edge of said floor to said aft ends of said lower side rails,
a rear frame assembly secured to said crash plate assembly, side walls, and roof, said rear frame assembly having a pair of opposed vertical side members, a lower cross member, and an upper cross member, and
a rear impact guard assembly having a pair of inboard supports, a pair of outboard supports, and a horizontal member secured to lower ends of said inboard and outboard supports of said guard assembly, respective ones of said inboard and outboard supports of said guard assembly secured to respective ones of said inboard and outboard supports of said crash plate assembly.

2. The trailer of claim 1 further comprising a pair of longitudinal frame members secured to said transverse frame members, each of said longitudinal frame members having an aft end secured to a respective one of said pair of inboard supports of said crash plate assembly.

3. The trailer of claim 2 wherein said inboard supports of said rear impact guard assembly are mirror images of each other, and said outboard supports of said rear impact guard assembly are mirror images of each other.

4. The trailer of claim 3 wherein each said support of said rear impact guard assembly comprises:
   a five-sided plate lying in a generally vertical plane generally parallel to the longitudinal axis of said trailer, said plate having a forward side vertical dimension, an aft side vertical dimension, an upper side horizontal dimension, and a lower side horizontal dimension,
   said forward side vertical dimension being less than said aft side vertical dimension, said upper side horizontal dimension being greater than said lower side horizontal dimension.

5. The trailer of claim 4 wherein each said support of said rear impact guard assembly further comprises:
   a forward vertical plate, an aft vertical plate, an upper horizontal plate, and a lower horizontal plate,
   said forward vertical plate secured to said forward side of said five-sided plate so as to be generally perpendicular to said five-sided plate,
   said aft vertical plate secured to said aft side of said five-sided plate so as to be generally perpendicular to said five-sided plate,
   said upper horizontal plate secured to said upper side of said five-sided plate so as to be generally perpendicular to said five-sided plate, and
   said lower horizontal plate secured to said lower side of said five-sided plate so as to be generally perpendicular to said five-sided plate.

6. A trailer comprising:
   a pair of opposed lower side rails extending generally parallel to a longitudinal axis of said trailer,
   a pair of opposed side walls, a main floor, and a roof, said main floor secured to said pair of lower side rails,
   a rear floor assembly secured to said pair of lower side rails, said rear floor assembly having a threshold plate and at least a pair of supports,
   a rear frame assembly secured to said rear floor assembly, side walls, and roof, said rear frame assembly having a pair of opposed vertical side members, a lower cross member, and an upper cross member, and
   a rear impact guard assembly having at least a pair of supports and a horizontal member secured to said supports, respective ones of said supports of said guard assembly secured to respective ones of said supports of said rear floor assembly.

7. The trailer of claim 6 wherein a configuration of said main floor and said rear floor assembly is selected from the group consisting of: 1) an aft end edge of said main floor is adjacent a forward end edge of said threshold plate, and 2) said main floor underlies said threshold plate and said aft end edge of said main floor is adjacent an aft end edge of said threshold plate.

8. The trailer of claim 6 further wherein:
   said rear floor assembly has a pair of inboard supports, and a pair of outboard supports,
   said rear impact guard assembly has a pair of inboard supports, and a pair of outboard supports, and
   respective ones of said supports of said guard assembly secured to respective ones of said supports of said rear floor assembly.

9. The trailer of claim 8 wherein said inboard supports of said rear impact guard assembly are mirror images of each other, and said outboard supports of said rear impact guard assembly are mirror images of each other.

10. The trailer of claim 6 wherein said rear floor assembly further comprises:
    a plurality of transverse frame members, and
    a plurality of longitudinal frame members interconnecting said transverse frame members,
    said threshold plate overlying said transverse frame members and said longitudinal frame members and secured to said transverse frame members and/or the longitudinal frame members,
    said rear floor assembly supports underlying said transverse frame members and said longitudinal frame members and secured to said transverse frame members and/or the longitudinal frame members.

11. The trailer of claim 8 further comprising:
    a plurality of transverse frame members spanning between said lower side rails and underlying and supporting said main floor, and
    a pair of longitudinal frame members secured to said transverse frame members, each of said longitudinal frame members having an aft end secured to a respective one of said pair of inboard supports of said rear floor assembly.

12. The trailer of claim 8 wherein each of said supports of said guard assembly has a horizontal and a vertical interface surface and each of said supports of said rear floor assembly has a horizontal and a vertical interface surface, said horizontal surfaces of said supports of said guard assembly mating with and secured to said horizontal surfaces of said supports of said rear floor assembly, said vertical surfaces of said supports of said guard assembly mating with and secured to said vertical surfaces of said supports of said rear floor assembly.

13. The trailer of claim 12 wherein horizontal interface surfaces are connected with bolts and said vertical interface surfaces are connected with bolts and shear pins.

14. A trailer comprising:
    a pair of opposed lower side rails extending generally parallel to a longitudinal axis of said trailer,
    a forward floor secured to said pair of lower side rails,
    a rear floor assembly secured to said pair of lower side rails, said rear floor assembly having a threshold plate and at least a pair of downwardly extending supports,
    a rear frame assembly having a lower cross member, said lower cross member secured to said rear floor assembly, and
    a rear impact guard assembly having at least a pair of upwardly extending supports and a horizontal member secured to lower ends of said supports of said guard assembly,
    respective ones of said supports of said guard assembly secured to respective ones of said supports of said rear floor assembly.

15. The trailer of claim 14 wherein said rear floor assembly further includes a generally rectangular framework, said threshold plate overlying and secured to said framework, said supports secured to said framework and extending downwardly therefrom.

16. The trailer of claim 14 further comprising:
a plurality of transverse frame members spanning between said lower side rails and underlying and supporting said forward floor, and
a pair of longitudinal frame members secured to said transverse frame members, each of said longitudinal frame members having an aft end secured to a respective one of said pair of supports of said rear floor assembly.

17. The trailer of claim 14 wherein a configuration of said forward floor and rear floor assembly is selected from the group consisting of: 1) an aft end edge of said forward floor is adjacent a forward end edge of said threshold plate, and 2) said forward floor underlies said threshold plate and said aft end edge of said forward floor is adjacent an aft end edge of said threshold plate.

18. The trailer of claim 14 wherein said lower side rails, rear floor assembly, rear frame assembly, and rear impact guard assembly are secured together with bolts.

19. The trailer of claim 18 wherein said rear floor assembly and rear impact guard assembly are additionally secured together with shear pins.

20. The trailer of claim 18 wherein said horizontal member is secured to said upwardly extending supports with bolts.

21. A trailer comprising:
a rear floor assembly having a threshold plate and at least a pair of supports extending downwardly from said threshold plate,
a rear lower cross member secured to said rear floor assembly, and
a rear impact guard assembly having at least a pair of supports and a horizontal member secured to lower ends of said supports of said guard assembly,
upper ends of respective ones of said supports of said guard assembly secured to lower ends of respective ones of said supports of said rear floor assembly.

22. The trailer of claim 21 wherein said rear floor assembly further includes a sub frame, said threshold plate overlying and secured to said sub frame, said pair of supports of said rear floor assembly secured to said sub frame and extending downwardly therefrom, said rear lower cross member secured to said sub frame.

23. The trailer of claim 22 wherein said rear lower cross member is a part of a rear frame assembly having a pair of opposed vertical side members and an upper cross member.

24. The trailer of claim 22 further including a pair of opposed lower side rails extending generally parallel to a longitudinal axis of said trailer, and a plurality of transverse frame members spanning between said lower side rails, said sub frame secured to said lower side rails and transverse frame members.

25. The trailer of claim 24 further including a main floor overlying and supported by said transverse frame members, said main floor having an aft end edge adjacent a forward end edge of said threshold plate.

26. The trailer of claim 21 wherein said supports of said rear impact guard assembly are secured to said supports of said rear floor assembly at least in part with shear pins.

* * * * *